United States Patent
Davidov et al.

(10) Patent No.: US 7,200,527 B1
(45) Date of Patent: *Apr. 3, 2007

(54) APPARATUS FOR COMPARING PERFORMANCE OF ELECTRONIC DEVICES

(75) Inventors: Eran Davidov, Sunnyvale, CA (US); Michael J. Parks, Union City, CA (US); Jamie D. Riggs, Longmont, CO (US); David C. Gurchinoff, San Jose, CA (US); Terrence Barr, Freiberg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/220,243

(22) Filed: Sep. 6, 2005

Related U.S. Application Data

(60) Provisional application No. 60/627,734, filed on Nov. 12, 2004, provisional application No. 60/627,367, filed on Nov. 12, 2004.

(51) Int. Cl.
*G06F 9/45* (2006.01)
(52) U.S. Cl. .................................................. 702/186
(58) Field of Classification Search ................ 702/186; 714/5
See application file for complete search history.

(56) References Cited

U.S. PATENT DOCUMENTS 5,303,166 A * 4/1994 Amalfitano et al. ........ 702/186
2005/0049847 A1* 3/2005 Miyamoto et al. ............ 703/22

OTHER PUBLICATIONS

U.S. Appl. No. 11/219,968.*

* cited by examiner

*Primary Examiner*—Bryan Bui
*Assistant Examiner*—Tung S. Lau
(74) *Attorney, Agent, or Firm*—Osha Liang LLP

(57) ABSTRACT

A test apparatus including a data interface configured to couple with at least one of a test device and a baseline device, and a computing device configured to perform a method including performing a first benchmark on a baseline device for a predetermined time interval, resulting in a first dataset representing work performed by the baseline devices, performing a second benchmark on a test device for the predetermined time interval resulting in a second dataset representing work performed by the test device, and using a heuristic including a number of tests to determine whether the test device has an acceptable level of performance relative to the baseline device.

6 Claims, 3 Drawing Sheets

APPARATUS FOR COMPARING PERFORMANCE OF ELECTRONIC DEVICES

CROSS-REFERENCE TO RELATED APPLICATIONS

This application claims benefit of U.S. Provisional Application Ser. No. 60/627,734, filed on Nov. 12, 2004, and U.S. Provisional Application Ser. No. 60/627,367, filed on Nov. 12, 2004. This application is related to U.S. patent application Ser. No. 11/219,968; SUN050324, filed on Sep. 6, 2005.

BACKGROUND

Electronic devices come in a wide variety of shape and sizes. Such devices include cellular telephones, pagers, personal digital assistants (PDA's), music players, set-top boxes, routers, home gateways, etc. In many cases, the device is characterized by a primary service it provides. However, it is often true that such devices perform multiple services. Thus, a cellular phone typically provides wireless phone services, and may also provide wireless access to data services such as email and the internet, and may be combined with calendaring, contact management, games, and other functions, thus performing services similar to those commonly found in a personal digital assistant (PDA).

With the diversity in the feature sets offered by these devices and the significant differences in the respective designs of such devices, devices will vary in their performance levels. A cellular phone may, for example, perform well as a phone device, but may suffer in its performance as a gaming device. Correspondingly, PDA devices may perform well for gaming or networking, but may suffer in other areas.

Manufacturers and others in the chain of commerce of electronic devices typically have certain minimum criteria or specifications a device must meet in order to be deemed acceptable. Once the minimum acceptable performance levels are determined, benchmarks are devised which gather data from the device. The manufacturer or other interested person performs those benchmarks and compares the resulting data with the minimum criteria to determine whether the tested device is acceptable.

SUMMARY

A method for evaluating portable electronic devices includes performing a first benchmark on a baseline device for a predetermined time interval, resulting in a first dataset representing work performed by the baseline device. The method further includes performing a second benchmark on a test device for the predetermined time interval resulting in a second dataset representing work performed by the test device. Finally, the method uses a heuristic comprised of a number of tests to determine whether the test device has an acceptable level of performance relative to the baseline device.

A test apparatus includes a data interface configured to couple with at least one of a test device and a baseline device; and a computing device. The computing device is configured to perform a method comprising performing a first benchmark on a baseline device for a predetermined time interval, resulting in a first dataset representing work performed by the baseline device. The method further includes performing a second benchmark on a test device for the predetermined time interval resulting in a second dataset representing work performed by the test device, and uses a heuristic comprised of a number of tests to determine whether the test device has an acceptable level of performance relative to the baseline device.

Other aspects and advantages of the invention will be apparent from the following description and the appended claims.

DETAILED DESCRIPTION

Figure 1:
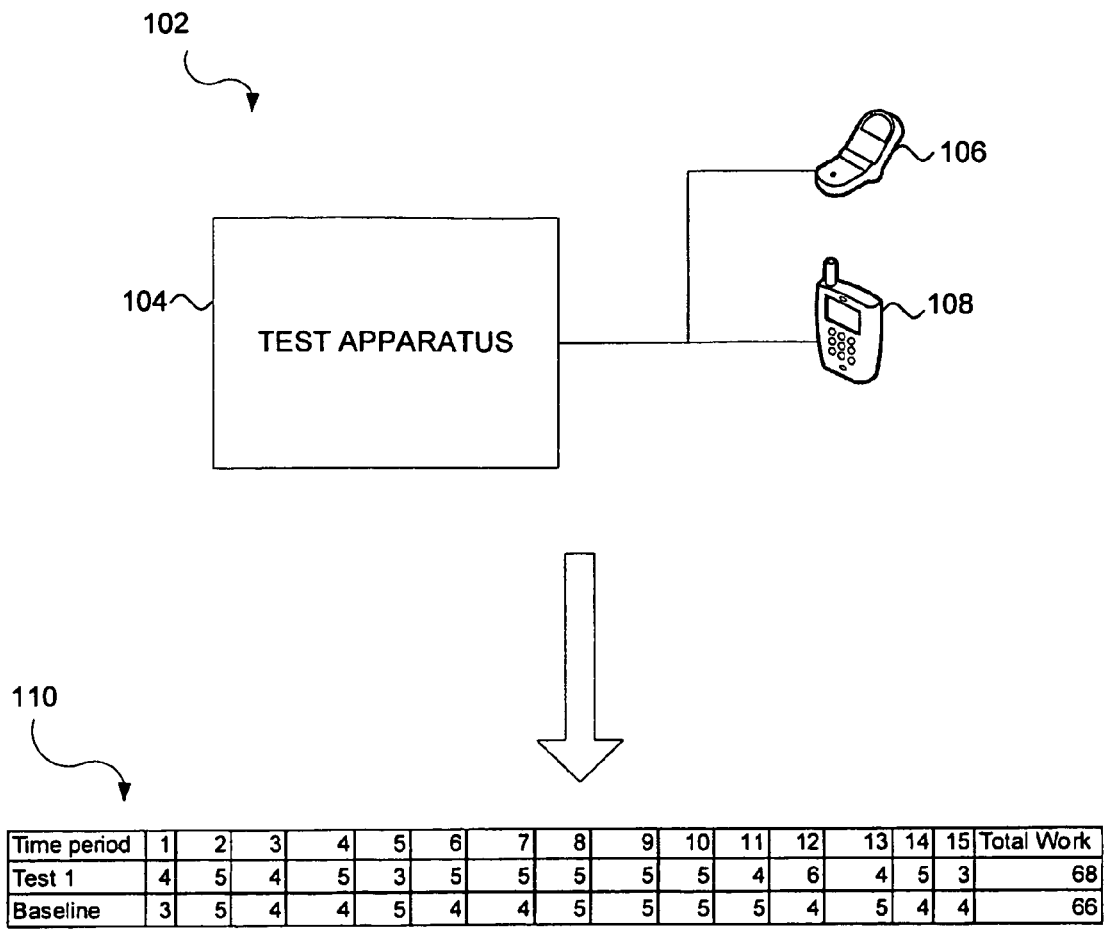
FIG. 1 shows a block diagram of a system according to one or more embodiments of the present invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for analyzing benchmark data from a test device against baseline data from a baseline device in order to determine whether the test device is operating within desired parameters.

More particularly, embodiments of the invention relate to a method and apparatus including functionality wherein a baseline device is benchmarked over a predetermined time interval. Data is collected at reasonably regular time periods within that predetermined time interval, resulting in baseline data representing work accomplished per unit time. A test device is benchmarked over approximately the same length of time as the predetermined time interval resulting in benchmark data representing work accomplished per unit time.

The resulting benchmark data from the test device is compared against the baseline data using one or more different methods in order to determine whether the test device is operating within desired parameters.

By way of example, according to one or more embodiments of the invention, a benchmark is accomplished over a one minute interval wherein data is collected in each 100 ms time period within that one minute interval. If deemed necessary, the benchmark may be repeated several more times over subsequent one minute intervals.

In this example, the benchmarking results in data being collected every 100 ms over a one minute interval, resulting in 600 data points for the test device, and 600 data points for the baseline device.

Benchmarking of the test device and benchmarking of the baseline device can, but does not need to, occur within relatively contiguous or overlapping time frames. In one or more embodiments of the invention, benchmarking of the two devices occurs approximately at the same time. In one or more embodiments of the invention, benchmarking of the baseline device occurs once to determine an overall baseline set of data against which test devices are compared, with the baseline device not being benchmarked again.

In one or more embodiments of the invention, the test device is benchmarked at any time, before or after the baseline device is benchmarked, and the data from the baseline device is compared with data from the test device at any time after both sets of data become available. Persons of ordinary skill in the art having benefit of this disclosure will readily recognize that various combinations exist when contemplating how often a baseline device will be benchmarked, and how many benchmarks will be performed, and when those benchmarks will be performed, while remaining within the scope and purpose of the invention.

FIG. 1 shows a block diagram of a system according to one or more embodiments of the present invention. System 102 includes test apparatus 104 coupled to baseline device 106 and test device 108 through a data interface provided for that purpose. Apparatus 104 includes a computing device such as a central processing unit or state machine configured to benchmark one or both of the test device and the baseline device over a predetermined time interval.

Baseline device 106 and test device 108 need only be devices having similar categories being benchmarked. For example, baseline device 106 may be a PDA, while test device 108 is a cell phone, with both devices having a video display, a central processing unit (CPU), memory, etc.

As previously discussed, the benchmarking of baseline device 106 may take place at any time to determine overall baseline data against which data from test devices are compared. In one or more embodiments of the invention, baseline device 106 and test device 108 are connected to the test apparatus 104 and benchmarked during overlapping time intervals. In one or more embodiments of the invention, baseline device 106 and test device 108 are not connected to the test apparatus 104 at the same time and are therefore benchmarked at different times, but over substantially similar intervals of time.

Resulting from the benchmarking of either one or both of baseline device 106 and test device 108 is data 110 which indicates work performed per unit time over the benchmarking interval, for one or both of the test device and the baseline device.

Figure 2:
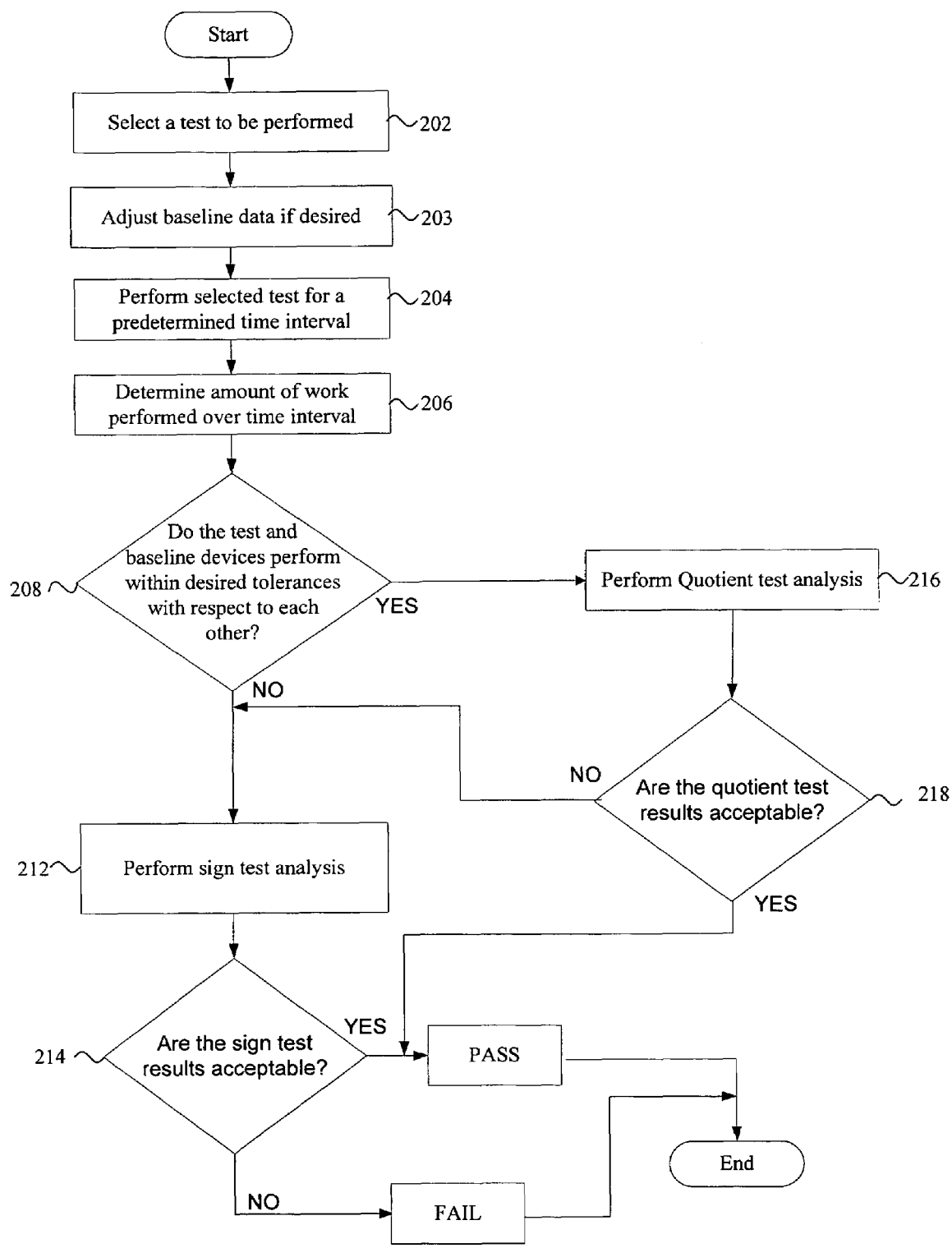
FIG. 2 shows a flowchart according to one or more embodiments of the invention.

FIG. 2 shows a flowchart according to one or more embodiments of the invention. Benchmarks suitable for different devices may vary, and may overlap different functional areas of the devices being benchmarked, such as graphics, processor throughput, memory write operations, memory read operations, database operations, etc. Persons of ordinary skill in the art having the benefit of this disclosure will readily recognize that many other types of benchmarks may apply to baseline device 106 and test device 108 while remaining within the scope and purpose of the present invention.

At 202, a benchmark is selected to be performed. In some circumstances, the test device and the baseline device may have originated from the same manufacturer. Further, the test and baseline devices may be the same model. In either of these cases, it may be desirable to perform the same benchmarks on both devices.

Alternatively, in one or more embodiments of the invention, the test and baseline devices are not the same model, but are manufactured by the same manufacturer. Finally, in one or more embodiments of the invention, the test device and the baseline device are not manufactured by the same manufacturer. In either of these cases, it may be desirable to run different benchmarks having similar requirements for the different devices.

As previously discussed, the benchmark being performed involves one or more functional areas of the test device 104 or baseline device 106. Many benchmarks will involve several functional areas. For example, a benchmark to produce several video frames on the video display screen of a test device or a baseline device may involve CPU and memory operations as well as video display operations.

Since the benchmark selected at 202 may involve many functional areas but is primarily designed to determine an amount of work performed over a predetermined time period, we shall refer to the benchmark selected at 202 as a 'work performed' benchmark regardless of the specific functional areas being benchmarked.

At 203, the baseline data is optionally adjusted. Adjustments may be made for different reasons, including to determine how much better than a given baseline data a test device is operating. Details relating to a method for adjusting the data upward or downward is described later with respect to FIG. 3.

At 204, the benchmark chosen at 202 is performed for a predetermined time interval. At 206, the amount of work performed over the predetermined time interval is optionally determined. Alternatively, data collected at reasonably regular time periods within the predetermined time interval indicate the amount of work performed over those regular time periods within the predetermined time interval.

At 208, the test device data and the baseline device data are compared to determine whether the test and baseline devices are performing within desired tolerances of each other with respect to work performed. In one or more embodiments of the invention, the total amount of work performed over the predetermined time interval for the test device is compared against the total amount of work performed by the baseline device over the same length of time.

If the total amount of work performed by the test device is within a predetermined threshold tolerance level of the total amount of work performed by the baseline device, the test device is determined to be operating within desired parameters for this portion of the analysis. The threshold tolerance level for various benchmarks may vary, based on the application being executed and the devices being compared.

In one or more embodiments of the invention, the test device and the baseline device must perform within five percent of each other in order for the test device to be operating within desired parameters. However, since the determination of an acceptable threshold and acceptable variation from that threshold depends on the character of the devices and the one or more software applications being executed, differences of greater than five percent or more may be acceptable in some circumstances.

If, at 208, the test device is determined not to be operating within desired parameters, the method proceeds at 212 when a well-known statistical analysis called the sign test is performed. The sign test is used to determine with high confidence whether the performance of a given test device compares favorably with a baseline device. To perform the sign test, individual data values from the test device are each compared with the individual corresponding data values from the baseline device. A comparison value C is determined by tallying the total number of test data values that are less than the corresponding baseline data values. A threshold value T is computed by $$T = 0.5*(n + \mathrm{sqrt}(n)*z)$$

where n is the number of data values in the test data set that are equal to the corresponding data values in the baseline data set, sqrt(n) represents taking the square root of n, z is a factor that represents the confidence level of the test data being accurate.

Values of z for various confidence levels are known to those of ordinary skill, and may be found in *Schaum's Outlines of Theory and Problems of Statistics*, Third Edition, (1999) in appendix 2, page 522.

Finally, C and T are compared at 214, and the benchmark is deemed to have passed if C>=T. Thus, if C>=T, the test device is operating within acceptable parameters, and passes. At this point, the method ends.

If, at 208, the test device is determined to be operating within desired parameters, the method proceeds at 216 when the quotient test analysis is performed.

The quotient test analysis divides the standard deviation of each set of data points by the average of that same set of data points. The results of that division operation for each of the two sets of data points (test and baseline) are then compared. If the difference between the two results does not exceed a given threshold quotient test value, the two devices are determined to be equivalent, and the test device is operating within acceptable parameters.

Although the quotient test analysis is presented here as one of several types of analysis performed on two sets of data, the quotient test may also be performed by itself. In one embodiment of the present invention, the quotient test is the only test performed on the data. If the results of the quotient test performed on the data received from the test device is within a predetermined variance from the quotient test results achieved using the baseline device, the test device is determined to be acceptable.

In the method of FIG. 2, if the test device is determined at 218 to be unacceptable, the method proceeds at 212 where the sign test is performed. If the test device is determined at 218 to be acceptable, the test device is determined to be acceptable and the method ends.

Any of the described operations may be performed on the data individually and separately, or one after the other. Thus, the work performed threshold test, the quotient test and the sign test may be performed independently as the sole test performed on the data, or may be performed with any or all of the other tests, in order to determine if a test device is operating within acceptable parameters.

Figure 3:
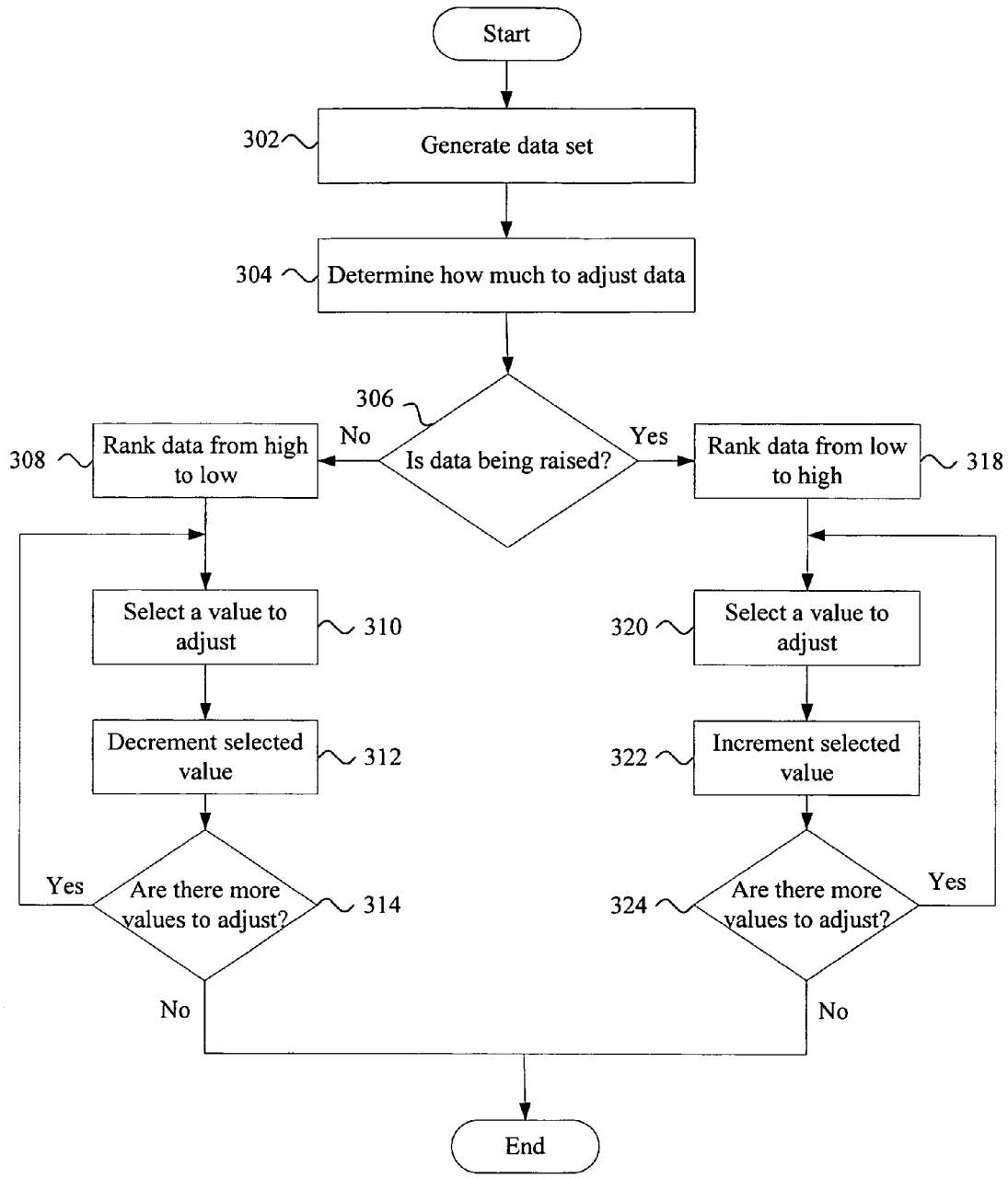
FIG. 3 shows a flowchart of a method according to one or more embodiments of the invention.

FIG. 3 shows a flowchart of a method according to one or more embodiments of the invention.

At 302 a dataset is generated such as might result from the benchmark being performed at 203. One reason to adjust a baseline dataset is to determine how much better or worse a test device dataset can be before that test device fails any of the three data analysis techniques discussed here. Although we provide an example of a baseline dataset being adjusted, it is equally valid to adjust the test device dataset, if desired.

The dataset may be adjusted as it exists for one long interval, or may instead be divided into smaller intervals of relatively equal length (e.g. each second of data being a different interval) for adjustment.

At 304, a determination is made as to the number of units intervals within the dataset of 302 are to be adjusted. In one or more embodiments of the invention, the adjustment is characterized as a number of units, such as three units, or five units, etc.

At 306, a determination is made as to whether the data is being raised. Since the adjustments to the data involve either raising or lowering the data, there are only two choices. Therefore, if the data is being raised, it isn't being lowered. Correspondingly, if the data is being lowered, it isn't being raised.

If, at 306, it is determined that the data is being lowered (e.g. not being raised), the method proceeds at 308 where the data is ranked in value from high to low to determine the order of the data by value.

At 310, a value to be adjusted is selected from the dataset. Because the data is being lowered, the first selected value is a value that is at the top of the ranking results, and is therefore either the highest data value in the dataset, or is at least the same value as the highest data value in the data set.

At 312, the selected data value is decremented by one unit. Thus, if the value of the selected data point is 52, the value resulting after the adjustment is 51. This data value will not be adjusted again unless the number of adjustments exceeds the number of points in the dataset and unless the number of desired increments for the data exceeds the number of data points in the interval.

At 314, a determination is made as to whether there are more adjustments to be made to the data within the interval. This determination is similar to determining whether a number of adjustments have been made which is equivalent to the determination made at 304.

If, at 314, a determination was made that additional adjustments are desired, the method proceeds again at 310 where another data value is selected for adjustment.

If, at 314, a determination was made that no additional adjustments are desired, the method ends.

If, at 306, a determination was made that the data is being raised (e.g. not being lowered), the method proceeds at 318 where the data is ranked by value from low to high to determine the order of the data by value.

At 320, a value to be adjusted is selected from the dataset. Because the data is being raised, the first selected value, for example, is a value that is at the top of the ranking results, and is therefore either the lowest data value in the dataset, or is at least the same value as the lowest data value in the data set.

At 322, the selected data value is incremented by one unit. Thus, if the value of the selected data point is 52, the value resulting after the adjustment is 53. This data value will not be adjusted again unless the number of adjustments exceeds the number of points in the dataset and unless the number of desired increments for the data exceeds the number of data points in the interval.

At 324, a determination is made as to whether there are more adjustments to be made to the data within the interval. This determination is similar to determining whether a number of adjustments have been made which is equivalent to the determination made at 304.

If, at 324, it is determined that additional adjustments are desired, the method proceeds again at 320 where another data value is selected for adjustment.

If, at 324, it is determined that no additional adjustments are desired, the method ends.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A test apparatus comprising:
   a data interface configured to couple with at least one of a test device and a baseline device; and
   a computing device configured to perform a method comprising
   performing a first benchmark on a baseline device for a predetermined time interval, resulting in a first dataset representing work performed by the baseline device;
   performing a second benchmark on a test device for the predetermined time interval resulting in a second dataset representing work performed by the test device;
   determining that the test device is initially acceptable when the total amount of work performed by the test device and the total amount of work performed by the baseline device differ by less than an acceptance threshold; and
   when the test device is initially acceptable, performing a quotient test on the first dataset and the second dataset, wherein the test device is determined to be finally acceptable.

2. The test apparatus of claim 1 wherein the first benchmark and the second benchmark are the same benchmark and wherein the test device and the baseline device are produced by the same manufacturer.

3. The test apparatus of claim 1 wherein data points are taken at regular time periods within the predetermined time interval, resulting in the first dataset.

4. The test apparatus of claim 1 wherein the method further comprises analyzing the first dataset and the second dataset using a sign test.

5. The test apparatus of claim 1 wherein the acceptance threshold is less than or equal to five percent of the total amount of work performed by the baseline device within the predetermined time interval.

6. The test apparatus of claim 1 wherein the quotient test comprises:
   dividing the standard deviation of the first dataset by the average of the first dataset, producing a first result;
   dividing the standard deviation of the second dataset by the average of the second dataset, producing a second result; and
   determining whether the difference between the first result and the second result meet previously defined acceptance criteria.

* * * * *